Nov. 1, 1966     J. H. STEINWAY     3,282,607
FIFTH WHEEL KING PIN LATCHING DEVICE FOR TRACTOR-TRAILERS
Filed Aug. 28, 1964

INVENTOR:
Joseph H. Steinway
BY Kurt Kelman
ATTORNEY 3,282,607
FIFTH WHEEL KING-PIN LATCHING DEVICE
FOR TRACTOR-TRAILERS
Joseph H. Steinway, c/o Turnta Inc., 23rd floor,
60 Broad St., New York, N.Y.
Filed Aug. 28, 1964, Ser. No. 392,764
Claims priority, application Germany, Aug. 28, 1963,
J 24,331
5 Claims. (Cl. 280—434)

This invention relates to semi-trailer hitches, and particularly to a latch arrangement for retaining a king pin in operating position in a lower fifth wheel.

It is known to employ locking pins for retaining the king pin in its operating position at the center of a fifth wheel. Such locking pins and cooperating elements of the hitch are subject to wear during use, and it is necessary to provide compensation for this wear.

The object of the invention is a fifth wheel arrangement in which compensation for locking pin wear is provided by a movement of the locking pin which is different and independent from the locking movement of the pin.

Figure 1:
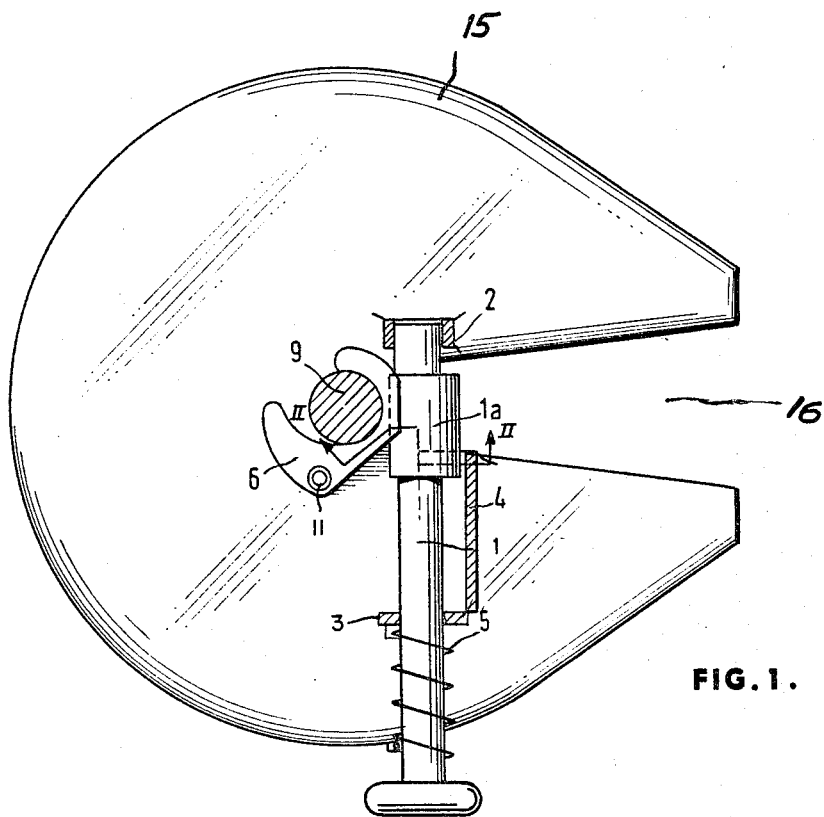
Figure 2:
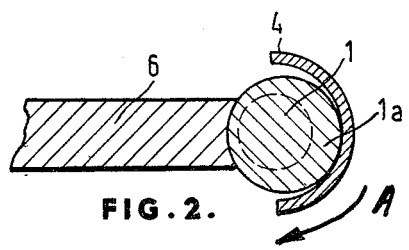

Other features and many of the attendant advantages of this invention will be readily appreciated as the same becomes better understood by reference to the following detailed description of preferred embodiments when considered in connection with the accompanying drawing in which:

FIG. 1 shows a fifth wheel arrangement of the invention in sectional plan view, the section being taken radially through the king pin; and FIG. 2 illustrates a detail of the fifth wheel arrangement of FIG. 1 in section on the line II—II.

Referring now to the drawing in detail, and initially to FIG. 1, there is seen a lower fifth wheel plate 15 of conventional shape having a radial recess 16 which is elongated in the normal direction of the tractor movement. The inner end portion of the recess 16 receives a king pin 9 of an upper fifth wheel, not otherwise shown, as is conventional.

The latch or locking arrangement for the king pin with which this invention is more particularly concerned includes a cylindrical locking pin 1 which is mounted on the fifth wheel plate 15 by means of two bearing lugs 2, 3 which are coaxial with the locking pin 1. A backing plate 4 is fixedly mounted on the fifth wheel plate 15. The backing plate is of cylindrically arcuate shape about the axis of the pin 1.

The pin 1 carries an integral cylindrical sleeve 1a which is eccentric with respect to the common axis of the pin 1 and of the bearing lugs 2, 3 and whose maximum spacing from that common axis corresponds to the internal diameter of the backing plate 4 so that the latter plate abuttingly engages the eccentric sleeve 1a as is best seen in FIG. 2.

A helical torsion and compression spring 5 is attached to the fifth wheel plate 15 and to the locking pin 1 in such a manner that it tends to rotate the pin clockwise, as viewed in FIG. 2, and to move the pin axially toward the illustrated position in which the locking pin blocks the king pin 9 in its normal operating position.

A hook-shaped latch 6 is pivotally attached to the fifth wheel plate 15 by a pin 11 which loosely engages an opening 12 in the latch 6 so as to permit limited radial movement of the latch 6 with respect to the pivot pin axis. In the illustrated position of the apparatus, respective conforming cylindrical contact faces of the latch 6 and of the eccentric sleeve 1a are engaged so that the sleeve urges the latch against the king pin 9.

When the king pin 9, the latch 6, or any part of the locking pin 1 wears during the operation of the hitch, tight engagement between the elements of the illustrated arrangement is ensured by rotation of the pin 1 under the urging of the spring 5, whereby a contact face portion of the eccentric sleeve 1a farther removed from the axis of the bearings 2, 3 is brought into engagement with the latch 6, or directly with the king pin 9.

When it is desired to release the king pin 9 from the illustrated operating position, the locking pin 1 is rotated about its axis and withdrawn axially against the restraint of the spring 5. If so desired, the pin 1 may be provided with a helical guide groove (not illustrated), and a guide member projecting from the bearing 3 into the groove may be provided to cause rotation of the pin 1 when it is axially withdrawn from the illustrated position.

Obviously, many modifications and variations of the present invention are possible in the light of the above teachings. It is therefore to be understood that within the scope of the appended claims, the invention may be practiced otherwise than as specifically described.

What is claimed is:

1. In a fifth wheel arrangement, in combination:
    (a) a fifth wheel member formed with an elongated recess, said recess having an inner end portion;
    (b) a king pin member movable in said recess toward and away from an operating position in said inner end portion;
    (c) a latch member mounted on said fifth wheel member for movement toward and away from a locking position in which said latch member retains said king pin member in said operating position thereof;
    (d) a locking pin member mounted on said plate member for rotation about an axis transverse of the direction of elongation of said recess, and for axial movement; and
    (e) eccentric means on said locking pin member, said eccentric means being alignable with said latch member by said axial movement of said locking member, and engaged with the aligned latch member for urging the same toward said locking position thereof when said locking pin member is rotated about said axis in a predetermined direction.

2. In an arrangement as set forth in claim 1, yieldably resilient means permanently urging said locking pin member to rotate in said predetermined direction.

3. In an arrangement as set forth in claim 2, said yieldably resilient means being operative to axially bias said locking pin member toward a position of alignment of said eccentric means with said latch member.

4. In an arrangement as set forth in claim 1, said eccentric means and said latch member having respective contact faces of conforming arcuate cross section, said contact faces engaging each other when said locking pin member is rotated in said predetermined direction.

5. In an arrangement as set forth in claim 1, pivot means connecting said latch member to said fifth wheel member for pivoting movement about a pivot axis.

References Cited by the Examiner

UNITED STATES PATENTS

| | | | |
|---|---|---|---|
| 1,929,220 | 10/1933 | Steinhauer | 280——434 |
| 2,736,574 | 2/1956 | Brauberger | 280—434 |
| 2,838,326 | 6/1958 | Georgi | 280—434 |
| 3,034,805 | 5/1962 | Becker | 280—434 |
| 3,056,612 | 10/1962 | Slaven | 280—434 |
| 3,063,738 | 11/1962 | Becker | 280—434 |

LEO FRIAGLIA, *Primary Examiner.*